United States Patent

Muhler

[15] 3,666,855

[45] May 30, 1972

[54] ORAL COMPOSITIONS AND METHODS FOR RETARDING DENTAL CARIES AND CALCULUS

[72] Inventor: Joseph C. Muhler, Indianapolis, Ind.

[73] Assignee: Indiana University Foundation, Bloomington, Ind.

[22] Filed: Jan. 29, 1968

[21] Appl. No.: 701,067

Related U.S. Application Data

[63] Continuation-in-part of Ser. No. 535,022, Mar. 17, 1966, abandoned, which is a continuation-in-part of Ser. No. 402,920, Oct. 9, 1964, abandoned.

[52] U.S. Cl. ..............................424/52, 424/54, 424/151, 424/202
[51] Int. Cl. ..........................................................A61k 7/16
[58] Field of Search ..............................424/54, 52; 167/93 P

[56] References Cited

UNITED STATES PATENTS

| | | | |
|---|---|---|---|
| 2,191,199 | 2/1940 | Hall | 424/57 |
| 3,151,027 | 9/1964 | Cooley et al. | 424/54 |

OTHER PUBLICATIONS

Dental Abstracts, Vol. 12, pages 539– 544, Sept. 1967
Draus et al., Dental Progress, Vol. 3, pages 79– 81, Jan. 1963
Grossman, J. Oral Surg., Oral Med., and Oral Path., Vol. 7, pages 484– 487, May 1954
McClure, J. Dental Research, Vol. 42, pages 693–699, March–April 1963

Primary Examiner—Richard L. Huff
Attorney—Ronald L. Engel, Daniel W. Vittum, Jr. and Gomer W. Walters

[57] ABSTRACT

Oral compositions may include in excess of 1 percent and up to about 40 percent of ammonium salts of condensation products of ammonia and phosphorus pentoxide, e.g.,

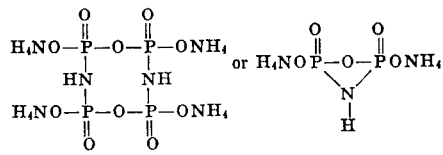

together with a carrier suitable for use in the oral cavity. Such compositions preferably also comprise stannous and fluoride ions and exhibit relatively low pH values (in the 4–5 range), and are highly effective in reducing the solubility of dental enamel. Moreover, such compositions also exhibit marked effectiveness in reducing the susceptability of the teeth to the accumulation of dental calculus.

12 Claims, No Drawings

ORAL COMPOSITIONS AND METHODS FOR RETARDING DENTAL CARIES AND CALCULUS

CROSS REFERENCE

This is a continuation-in-part of applicant's co-pending United States Pat. application ANTICARIOGENIC COMPOSITIONS AND METHODS, Ser. No. 535,022, filed Mar. 17, 1966 now abandoned, which in turn is a continuation-in-part of applicant's United States Pat. application DENTIFRICE PREPARATION, Ser. No. 402,920, filed Oct. 9, 1964, now abandoned.

BACKGROUND OF THE INVENTION

1. Field of the Invention

The present invention relates to oral compositions comprising certain aminophosphates or fluoride-phosphate combinations, and to methods for their use. More particularly, this invention relates to oral compositions comprising an ammonium salt of a condensation product of ammonia and phosphorus pentoxide which renders the composition more effective for anticariogenic and anticalculus oral hygiene and therapeutics. The term "oral compositions" is used herein to designate products which are not intentionally ingested in the ordinary course of usage or administration, but are employed in the oral cavity in a manner such that substantially all of the dental surfaces are contacted therewith. Such products include, for example, dentifrices, mouthwashes, topical solutions, and prophylaxis pastes. In addition to the said salts, such oral compositions also comprise a "carrier suitable for use in the oral cavity," a term meant to include those non-toxic materials (such as cleaning and polishing agents, sudsing agents, humectants, and the like described hereinafter to be constituents of dentifrices and prophylaxis pastes), as well as water and other liquids which serve as carrier vehicles in mouthwashes and topical solutions.

2. Description of the Prior Art

It has heretofore been proposed to combine fluoride and water soluble, inorganic phosphate in anticariogenic compositions adapted for oral use, such as dentifrice preparations and prophylactic paste compositions. Although the utilization of water soluble, inorganic phosphates in fluoride-containing oral compositions is known to the art (e.g., Canadian Pat. No. 570,803), the soluble phosphate content of such compositions contributes relatively little to the anticariogenic effect of fluorides at the low concentrations disclosed.

The aforesaid Ser. No. 535,022 parent application of which this application is a continuation-in-part discloses that fluoride-containing compositions having an acid pH (e.g., a pH in the range of 4–5) containing relatively high levels of water soluble phosphate compounds exhibit improved anticariogenic effectiveness in comparison with corresponding compositions having either no soluble phosphate content or even a low soluble phosphate content.

The present invention is predicated upon the discovery that particular types of soluble phosphate, namely, ammonium salts of condensation products of ammonia and phosphorus pentoxide, possess surprising anticalculus activity per se, and exhibit markedly enhanced anticariogenic effectiveness in the presence of fluoride ions, and preferably stannous ions as well.

Dental research has developed substantial evidence that beyond the age of forty years loss of teeth is predominantly the result of periodontal involvement rather than dental caries. The most important single factor contributing to periodontal disease is the accumulation of dental calculus (e.g., salivary tartar) on the teeth. These deposits result in tissue inflammation of the surrounding gingiva, and, as the condition increases in severity, the supporting bone is also affected. These reactions lead to the destruction of the supporting structures and the subsequent mass loss of teeth. The accumulation of dental calculus has conveniently been sought to be inhibited through the use of newer and better cleaning and polishing agents. A more highly polished and cleaned tooth, and hence a smoother one, is considered to be less susceptible to accumulation of solid debris such as calculus than a rough tooth surface. However, chemical, i.e., as opposed to physical (such as cleaning and polishing), agents have been much less widely used because of the safety problems posed by such chemical agents. Thus, the subject invention has as a primary aspect the utilization of compositions comprising ammonium salts of condensation products of ammonia and phosphorus pentoxide which exhibit surprising and unexpected effectiveness as anticalculus agents (i.e., agents useful in reducing the tendency of oral hard tissues to accumulate dental calculus), and yet which may be safely employed in the buccal cavity.

SUMMARY OF THE INVENTION

In accordance with the subject invention, it has been found that oral compositions should include in excess of 1 percent and up to about 40 percent (preferably from about 5 percent to about 15 percent) of ammonium salts of condensation products of ammonia and phosphorus pentoxide, e.g.,

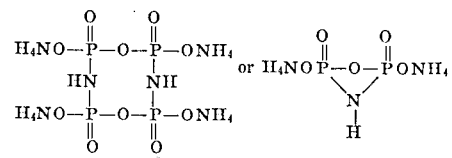

and a carrier suitable for use in the oral cavity. Such oral compositions preferably exhibit relatively low pH values (in the 4–5 range) when fluoride ion is employed therein, and are highly effective in reducing the solubility of dental enamel. As is well known to one skilled in the art, dental caries is caused, at least in part, by solution of enamel in biologically produced intraoral acids, and decreasing the solubility of enamel in such acids can significantly reduce dental caries. The effectiveness of anticariogenic agents in reducing the solubility of dental enamel in acid is a well-known and reliable indicator of the efficacy of the agent.

Accordingly, it is a primary object of this invention to provide new and unique oral compositions characterized by the inclusion of ammonium salts of condensation products of ammonia and phosphorus pentoxide.

It is a related object of this invention to provide acidulated oral compositions of the character described containing fluoride ions that exhibit improved anticariogenic effectiveness.

A further object is to provide new methods useful in the control of dental caries.

A still further object is to provide new compositions useful in reducing the accumulation of dental calculus on oral hard tissues.

The objects, advantages, and features of the subject invention will hereinafter appear from the following detailed description of the invention, including exemplary embodiments thereof.

DETAILED DESCRIPTION OF THE PREFERRED EMBODIMENTS

The oral compositions of this invention comprise in excess of from about 1 percent to about 40 percent (preferably from about 5 percent to about 15 percent) of ammonium salts of condensation products of ammonia and phosphorus pentoxide, e.g.,

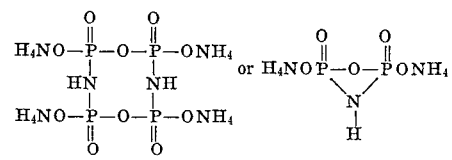

and a carrier suitable for use in the oral cavity. These salts and a mode of preparation thereof are set forth and described in U.S. Pat. No. 2,122,122. Such salts are commercially available from the Stauffer Chemical Company under the trademark "Victamide" and are hereinafter referred to by the "Victamide" name. Such oral compositions preferably also comprise stannous and fluoride ions and exhibit relatively low pH values (in the 4–5 range). Carriers suitable for use in the oral cavity include, in the case of dentifrices and prophylaxis pastes, cleaning and polishing agents and the other constituents ordinarily provided in dentifrices and prophylaxis pastes. In the case of topical solutions and mouthwashes, suitable carriers include water and other liquids.

Such compositions exhibit substantial effectiveness in reducing the susceptibility of oral hard tissues to the accumulation of dental calculus. Additionally, when employed in combination with stannous and/or fluoride compounds, oral compositions containing Victamide in the foregoing percentages exhibit a level of anticariogenic activity which is substantially and surprisingly greater than is attainable with stannous and fluoride ions without Victamide.

Fluoride compounds which supply fluoride ions in aqueous solution and which are thus suitable for use in the oral compositions of this invention are, of course, well known in the art. Suitable examples of such fluoride compounds are water soluble fluoride salts such as $SnF_2$, $NaF$, $SnF_4$, $KF$, $InF_3$, $PbF_2$, and $LiF$, as well as more complex water soluble fluoride-containing salts such as fluorosilicates, e.g., $Na_2SiF_6$, fluorozirconates, e.g., $SnZrF_6$, fluorostannites, e.g., $NaSnF_3$, fluorotitanates, e.g., $NaTiF_5$, fluorogermanates, e.g., $K_2GeF_6$, $Zr(GeF_6)_{22}ClF_3$. Mixtures of suitable fluoride salts can also be utilized. Preferably, stannous ion-containing fluoride salts (such as $SnF_2$ and $SnZrF_6$) are employed.

Various compatible cleaning and polishing agents suitable for use in the dentifrice embodiments of this invention are known in the art, including insoluble calcium metaphosphate, insoluble sodium metaphosphate, calcium pyrophosphate, calcium hydrogen phosphate dihydrate, anhydrous calcium hydrogen phosphate, and substantially water impervious, cross-linked, thermosetting, highly polymerized, synthetic resins (e.g., melamine formaldehyde resins) as described in U.S. Pat. No. 3,070,510, and, preferably, zirconium silicate or mixtures of zirconium silicate with other cleaning and polishing agents (e.g., talc) as set forth and described in applicant's co-pending Ser. No. 673,283 application, filed Oct. 6, 1967 now U.S. Pat. No. 3,450,813. Mixtures of such polishing agents may also be employed.

It is possible that where Victamide is employed at higher concentrations problems of enamel erosion (decalcification) may be experienced, primarily because of the strength of Victamide as a chelating agent and its attraction for calcium ions. However, it has been found that the presence of divalent cations (e.g., $Ca^{++}$, $Mg^{++}$, $Sn^{++}$, or the like) renders the Victamide completely safe. Thus, preferred compositions contain at least about 0.1 percent of such cations or mixtures thereof. Stannous ion is preferred because of its additional benefits in caries prevention. Stannous chloride and especially stannous fluoride and stannous fluorozirconate are especially preferred sources of stannous ion.

As previously noted, oral compositions produced in accordance with the present invention comprise about 1–40 percent and preferably about 5–15 percent Victamide. Such compositions preferably comprise fluoride ion at a level of about 0.01 to 15 percent, depending upon the particular end use to which the composition is to be put. In addition, such dentifrice and prophylactic paste compositions preferably comprise about 20–80 percent compatible cleaning and polishing agent, depending upon the particular formulation desired, as is well known to one skilled in the art.

DENTIFRICE PREPARATIONS

Oral compositions adapted for regular home use as dentifrice preparations and the like typically comprise about 20–70 percent compatible cleaning and polishing agent as a carrier suitable for use in the oral cavity. The Victamide content should be in excess of 1 percent up to about 40 percent, and preferably from about 5 to 15 percent, by weight of the dentifrice preparation. The optimum Victamide content will vary in accordance with the pH desired and with the particular polishing agent and active components utilized. Such compositions exhibit substantial effectiveness as anticalculus agents.

Preferably, a minor but effective and non-toxic amount of fluoride compound, usually within a range sufficient to supply from about 0.01 to about 1.0 percent (preferably about 0.1 percent fluoride ion, is also provided in the composition to render it anticariogenic. When $SnF_2$ or $SnZrF_6$ are utilized, such salts are preferably employed at a level of about 0.4 percent and 0.3 percent respectively (i.e., about 0.4% $SnF_2$ supplies about 0.1% fluoride ion and about 0.3% $SnZrF_6$ supplies about 0.1% fluoride ion).

Dentifrice preparations produced in accordance with the present invention and containing fluoride ion preferably exhibit pH values which lie in the acidic range, generally less than a pH of 5.0. Preferably, such preparations exhibit pH values of 4.0–5.0.

The dentifrice preparations are prepared in a conventional manner and will usually include additional ingredients to render the over-all composition commercially acceptable to consumers.

Toothpastes require a binder substance to impart desired textural properties. Natural gum binders such as gum tragacanth, gum karaya, gum arabic, etc. and seaweed derivatives such as Irish moss and alginates, and water soluble cellulose derivatives, such as hydroxyethyl cellulose and sodium carboxymethyl cellulose can be used for this purpose. Desirably, those materials are employed which are most compatible with fluoride ion. Binders which have no ionic groups, such as hydroxyethyl cellulose are especially preferred. Improvements in texture can also be attained by including an additional material such as colloidal magnesium aluminum silicate.

Thickening agents in an amount of from 0.5 to 5.0 percent by weight can be used to form a satisfactory toothpaste.

Toothpastes conventionally contain sudsing agents. Suitable sudsing agents include, but are not limited to, water-soluble alkyl sulfates having from eight to 18 carbon atoms in the alkyl radical, such as sodium lauryl sulfate, water-soluble salts of sulfonated monoglycerides of fatty acids having from 10 to 18 carbon atoms in the alkyl radical such as sodium coconut monoglyceride sulfonate, salts of fatty acid amides of taurines such as sodium-N-methyl palmitoyl tauride, and salts of fatty acid esters of isethionic acid.

Sudsing agents can be used in compositions of this invention in an amount of from about 0.5 percent to about 5.0 percent by weight of the total composition.

It is also desirable to include some humectant material in a toothpaste to keep it from hardening. Materials commonly used for this purpose include glycerine, sorbitol, and other polyhydric alcohols. The humectants can comprise up to 35 percent of the toothpaste composition.

Flavoring materials may be included in toothpaste formulations including small amounts of oils of wintergreen and peppermint and sweetening agents such as saccharin, dextrose, and levulose.

Preferred fluoride-Victamide dentifrice preparations are given hereinafter by way of example, but it should be understood that such examples are presented for purposes of illustration, but not of limitation.

EXAMPLE I

| Constituent | Parts by Weight (%) |
| --- | --- |
| Zirconium silicate | 43.0 |
| Victamide | 1.0 |
| Glycerine | 12.8 |
| Sorbitol (70% aqueous solution) | 14.8 |
| Sodium coconut monoglyceride sulfonate | 1.0 |
| Sodium lauryl sulfate | 1.0 |
| Veegum (magnesium aluminum silicate) | 1.0 |
| Sodium carboxymethyl cellulose | 1.0 |
| Flavoring agents | 0.1 |
| Coloring agents | 1.0 |
| Saccharine, sodium | 0.1 |
| Distilled water | 23.2 |
| | Total: 100.0 |

EXAMPLE II

| Constituent | Parts by Weight (%) |
| --- | --- |
| Zirconium silicate | 15.0 |
| Calcium pyrophosphate | 30.0 |
| Victamide | 10.0 |
| Stannous fluorozirconate | 0.3 |
| Glycerine | 12.0 |
| Sorbitol (70% aqueous solution) | 15.0 |
| Sodium coconut monoglyceride sulfonate | 0.5 |
| Sodium lauryl sulfate | 2.0 |
| Veegum (magnesium aluminum silicate) | 0.4 |
| Sodium carboxymethyl cellulose | 1.0 |
| Coloring agents | 0.4 |
| Flavoring agents | 0.8 |
| Saccharine, sodium | 0.2 |
| Distilled water | 12.4 |
| | Total: 100.0 |

EXAMPLE III

| Constituent | Parts by Weight (%) |
| --- | --- |
| Calcium pyrophosphate | 45.6 |
| Victamide | 5.0 |
| Stannous fluoride | 0.4 |
| Glycerine | 12.0 |
| Sorbitol (70% aqueous solution) | 15.0 |
| Sodium coconut monoglyceride sulfonate | 0.5 |
| Sodium lauryl sulfate | 2.0 |
| Veegum (magnesium aluminum silicate) | 0.4 |
| Sodium carboxymethyl cellulose | 1.0 |
| Coloring agents | 0.5 |
| Flavoring agents | 0.6 |
| Saccharine, sodium | 0.1 |
| Distilled water | 16.9 |
| | Total: 100.0 |

EXAMPLE IV

| Constituent | Parts by Weight (%) |
| --- | --- |
| Calcium hydrogen phosphate dihydrate | 24.0 |
| Anhydrous calcium hydrogen phosphate | 24.0 |
| Victamide | 15.0 |
| Stannous chloride | 1.0 |
| Glycerine | 13.0 |
| Sorbitol (70% aqueous solution) | 15.0 |
| Sodium coconut monoglyceride sulfonate | 1.0 |
| Sodium lauryl sulfate | 1.0 |
| Veegum (magnesium silicate) | 1.0 |
| Sodium carboxymethyl cellulose | 1.0 |
| Flavoring agents | 0.2 |
| Coloring agents | 0.5 |
| Saccharine, sodium | 0.1 |
| Distilled water | 3.2 |
| | Total: 100.0 |

EXAMPLE V

| Constituent | Parts by Weight (%) |
| --- | --- |
| Zirconium silicate | 14.0 |
| Improved talc* | 28.0 |
| Calcium chloride | 0.5 |
| Victamide | 10.0 |
| Glycerine | 12.0 |
| Sorbitol (70% aqueous solution) | 14.0 |
| Sodium coconut monoglyceride sulfonate | 0.5 |
| Sodium lauryl sulfate | 2.0 |
| Veegum (magnesium aluminum silicate) | 1.0 |
| Sodium carboxymethyl cellulose | 1.0 |
| Coloring agents | 0.5 |
| Flavoring agents | 0.5 |
| Saccharine, sodium | 0.2 |
| Distilled water | 15.8 |
| | Total: 100.0 |

*Talc, $Mg_3Si_4O_{10}(OH)_2$, containing at least a minor amount of tremolite, $CaMg_3(SiO_3)_4$, as an impurity, as disclosed in applicant's co-pending U.S. Pat. application Ser. No. 673,283, filed October 6, 1967.

EXAMPLE VI

| Constituent | Parts by Weight (%) |
| --- | --- |
| Zirconium silicate | 15.0 |
| Resin* | 30.0 |
| Victamide | 5.0 |
| Sodium fluoride | 0.2 |
| Glycerine | 13.0 |
| Sorbitol (70% aqueous solution) | 15.0 |
| Sodium coconut monoglyceride sulfonate | 1.0 |
| Sodium lauryl sulfate | 1.0 |
| Veegum (magnesium aluminum silicate) | 1.0 |
| Sodium carboxymethyl cellulose | 1.0 |
| Flavoring agents | 0.5 |
| Coloring agents | 0.7 |
| Saccharine, sodium | 0.1 |
| Distilled water | 16.5 |
| | Total: 100.0 |

*U.S. Patent No. 3,070,510.

Dentifrice preparations formulated in the foregoing manner are suitable for frequent application to teeth (e.g., as often as several times per day). When used in this manner, a new and useful method is provided for the control of dental caries and/or calculus.

PROPHYLACTIC PASTE COMPOSITIONS

The oral compositions of the present invention include, in addition to the described dentifrice preparations, prophylactic paste compositions adapted for relatively infrequent application (e.g., once or twice a year), either professionally (i.e., by a dentist or dental hygienist) or self-application. A prophylactic paste composition generally differs from a dentifrice preparation in that the cleaning and polishing component thereof is much more abrasive (and, as a result, is a better tooth cleaner). Since a prophylactic paste composition is applied only once or twice per year, a more abrasive cleaning and polishing agent may safely be employed therein than in a dentifrice preparation (i.e., if the more abrasive cleaning and polishing agent were used in a dentifrice preparation adapted for frequent application, the agent might permanently damage the oral hard tissues).

The compatible substances previously described as suitable cleaning and polishing agent for incorporation in dentifrice preparations may also be employed as the cleaning and polishing component of prophylactic paste compositions. However, in order that the desired optimal level of cleaning and polishing effectiveness be obtained, a different particle size and surface configuration for the substance may be desired. For example, a suitable zirconium silicate preparation for use in a dentifrice preparation is disclosed and claimed in applicant's co-pending United States patent application DENTIFRICE PREPARATION, Serial No. 673,283, filed Oct. 6, 1967 now U.S. Pat. No. 3,450,813, and a suitable zirconium silicate cleaning and polishing agent for use in a prophylactic paste composition is described and claimed in applicant's U.S. Pat. No. 3,257,282, granted June 21, 1966.

Other suitable cleaning and polishing agents include mixtures of zirconium silicate and tin dioxide (as set forth and described in applicant's co-pending United States patent application, Ser. No. 558,270, filed June 17, 1966) now U.S. Pat. No. 3,378,445, lava pumice, silica powder, calcium carbonate, and the like.

Prophylaxis paste compositions in accordance with the present invention are formulated with about 1–40 percent and preferably about 5–15 percent Victamide. The cleaning and polishing agent serves as a carrier and is employed within a range of from about 30 to 80 percent, depending upon the particular formulation desired, as is well known to one skilled in the art.

Such oral compositions are effective in reducing the susceptibility of the oral hard tissues to the accumulation of dental calculus.

In addition to the foregoing essential ingredients, fluoride ion is preferably employed at an effective and non-toxic level, usually within a range of from about 1 to about 15 percent, by weight of the prophylactic paste composition. When $SnF_2$ or $SnZrF_6$ are utilized, such salts are preferably employed at a level of about 8 percent and 30 percent, respectively (i.e., about 8% $SnF_2$ supplies about 2% fluoride ion and about 8% $SnZrF_6$ supplies about 10% fluoride ion).

Those prophylactic paste compositions produced in accordance with the present invention which contain fluoride ion exhibit pH values which lie in the acidic range, generally less than a pH of 5.0. Preferably, such preparations exhibit pH values of 4.0–5.0.

The prophylactic paste compositions are prepared in a conventional manner and usually include additional ingredients that render the over-all composition commercially acceptable. For example, prophylactic paste compositions typically embody conventional components such as bleaching agents, binders, humectants, flavoring agents, and the like.

Preferred prophylactic paste compositions produced in accordance with the present invention are given hereinafter in Examples VII–IX, but it should be understood that the Examples are presented for purposes of illustration, but not of limitation.

EXAMPLE VII

| Constituent | Parts by Weight (%) |
| --- | --- |
| Zirconium silicate | 55.0 |
| Victamide | 10.0 |
| Stannous fluorozirconate | 15.0 |
| Glycerine | 5.0 |
| Sorbitol (70% aqueous solution) | 7.0 |
| Veegum (magnesium aluminum silicate) | 0.7 |
| Sodium carboxymethyl cellulose | 1.0 |
| Saccharine, sodium | 0.2 |
| Sodium cyclamate | 0.4 |
| Flavoring agent | 2.0 |
| Coloring agent | 0.5 |
| Distilled water | 3.2 |
| | Total: 100.0 |

EXAMPLE VIII

| Constituent | Parts by Weight (%) |
| --- | --- |
| Zirconium silicate | 45.0 |
| Tin dioxide | 5.0 |
| Stannous fluoride | 9.0 |
| Victamide | 15.0 |
| Glycerine | 5.0 |
| Sorbitol (70% aqueous solution) | 7.0 |
| Veegum (magnesium aluminum silicate) | 0.7 |
| Sodium carboxymethyl cellulose | 1.0 |
| Saccharine, sodium | 0.2 |
| Sodium cyclamate | 0.4 |
| Flavoring agent | 2.0 |
| Coloring agent | 0.5 |
| Distilled water | 9.2 |
| | Total: 100.0 |

EXAMPLE IX

| Constituent | Parts by Weight (%) |
| --- | --- |
| Lava pumice | 48.0 |
| Victamide | 5.0 |
| Glycerine | 9.0 |
| Sorbitol (70% aqueous solution) | 11.1 |
| Veegum (magnesium aluminum silicate) | 0.7 |
| Sodium carboxymethyl cellulose | 1.0 |
| Saccharine, sodium | 0.2 |
| Sodium cyclamate | 0.4 |
| Flavoring agent | 2.0 |
| Coloring agent | 0.5 |
| Distilled water | 22.1 |
| | Total: 100.0 |

A prophylactic paste composition produced in accordance with the present invention finds utility as an agent adapted for semi-annual application by a dentist or dental hygienist. Such a composition may also advantageously be employed by a person to thoroughly clean his own teeth under professional supervision at similar semi-annual intervals.

Where the prophylactic paste compositions formulated in the foregoing manner are utilized properly (either on a professional or self-administered basis), a new and useful method is provided for the control of dental caries and/or calculus.

OTHER ORAL COMPOSITIONS

In addition to dentifrices and prophylaxis pastes, Victamide finds utility in other oral compositions (e.g., topical solutions and mouthwashes) comprising stannous and fluoride ions, as shown in the following Examples.

EXAMPLE X — Topical Solution

| Constituent | Parts by Weight (%) |
| --- | --- |
| Victamide | 5.0 |
| Flavoring agent | 1.5 |
| Saccharine, sodium | 0.1 |
| Distilled water | 93.4 |
| | Total: 100.0 |

EXAMPLE XI — Topical Solution

| Constituent | Parts by Weight (%) |
| --- | --- |
| Stannous fluoride | 2.0 |
| Victamide | 10.0 |
| Flavoring agent | 2.0 |
| Saccharine, sodium | 0.2 |
| Distilled water | 85.8 |
| | Total: 100.0 |

EXAMPLE XII — MOUTHWASH

| Constituent | Parts by Weight (%) |
| --- | --- |
| Victamide | 5.0 |
| Sorbitol (70% aqueous solution) | 10.0 |
| Ethyl alcohol (95% aqueous solution) | 20.6 |
| Polyoxyethylene sorbitan monostearate | 0.6 |
| Bactericidal agent | 0.1 |
| Coloring agent | 0.4 |
| Flavoring agent | 0.2 |
| Saccharine, sodium | 0.2 |
| Sodium cyclamate | 0.2 |
| Distilled water | 62.7 |
| | Total: 100.0 |

EXAMPLE XIII — MOUTHWASH

| Constituent | Parts by Weight (%) |
| --- | --- |
| Victamide | 10.0 |
| Sorbitol (70% aqueous solution) | 10.0 |

| | |
|---|---|
| Ethyl alcohol (95% aqueous solution) | 20.6 |
| Polyoxyethylene sorbitan monostearate | 0.6 |
| Bactericidal agent | 0.1 |
| Coloring agent | 0.4 |
| Flavoring agent | 0.2 |
| Saccharine, sodium | 0.2 |
| Sodium cyclamate | 0.2 |
| Distilled water | 57.7 |
| | Total: 100.0 |

EXPERIMENTAL EVALUATIONS

Anticalculus Effectiveness

The effectiveness of an agent as an inhibitor of dental calculus formation may be determined in accordance with the following procedure. Sections of enamel, approximately square in shape, were cut from the incisal one-half of the crowns of bovine maxillary central incisors, by means of diamond discs. The sections were embedded in pre-formed clear acrylic blocks, using pink denture acrylic as an adhesive, so that only the labial surfaces were exposed. Holes, placed at several millimeters distance from the tooth sections, were then bored through the acrylic blocks in order to receive orthodontic attachment wires.

After receiving certain treatments, described hereinafter, the enamel blocks were attached to a calculus machine, the machine designed to alternately immerse the enamel blocks in pooled human saliva and expose them to the air for successive 30-second periods.

A total of 13 enamel blocks were used in the experimental evaluation. These blocks were divided into 2 groups. Group I (the control group) received a "prophylaxis type" treatment using a flour of pumice paste for 3 minutes and were then revolved through pooled human saliva for 24 hours of each of the 28 days of the test period. Group II received a "prophylaxis type" treatment using a flour of pumice for 3 minutes. Following treatment, these enamel blocks were attached to the calculus machine and revolved through pooled saliva for 23 hours. The saliva was then removed from the saliva reservoir, and, after the blocks had been rinsed with distilled water, the reservoir compartment was refilled with a 5.0 percent aqueous solution of Victamide. The enamel blocks were then allowed to revolve through this solution. At the end of 1 hour the Victamide solution was removed; the blocks again rinsed with distilled water, and the reservoir refilled with fresh saliva. This procedure was repeated daily throughout the test period.

At the conclusion of the 28-day test period, the 13 enamel blocks were removed from the calculus machine, and the calculus weight deposited per tooth surface area (in terms of a mean calculus weight per surface area) was determined. In addition, the blocks were examined using a Visual Score Index. Scores used in the Visual Score Index were visually determined within the range of 0.0 (no calculus-like deposits) and 5.0 (calculus deposits totally covering enamel sections).

Table I summarizes the results of the foregoing calculus inhibition test. The data of Table I demonstrate that very substantial reductions in calculus formation were experienced through the utilization of the aqueous Victamide solution in accordance with the present invention.

TABLE I

| Number of enamel sections | Prophylaxis agent | Anticalculus agent | Mean visual score | Percent reduced | Mean calculus wt. per surface area | Percent reduced |
|---|---|---|---|---|---|---|
| 6 | Flour of pumice. | None | 2.1 | | .0280 | |
| 7 | do | Victamide [1] | 0.7 | 66.7 | .0117 | 58.2 |

[1] 5% aqueous solution.

Thus, the subject invention provides a means of reducing the accumulation of dental calculus on tooth surfaces.

Anticariogenic Effectiveness

The effectiveness of the oral compositions of the present invention in the reduction of the incidence of dental caries has been demonstrated by the following experimental evaluations. The effect of various compositions in reducing the solubility rate of dental enamel in acid is a reliable indicator of anticariogenic effectiveness. Enamel solubility characteristics of dental compositions can be determined by a variety of tests well known in the art. The particular test for reduction in tooth enamel solubility described herein comprises a comparison of acid solubility of a given tooth before and after treatment with a given test composition. The said comparison is expressed as ESR, that is, enamel solubility reduction.

Rat tooth ESR is determined in vivo as follows. The teeth of a group of suitably selected test rats are given a number of brushings with various dentifrice preparations over a suitable period of time. The animals are thereafter sacrificed. Each mandibular hemijaw is removed and the clinical crowns of each are decalcified in 0.2N (pH 4) sodium acetate buffer for twenty minutes, and the decalcification solutions are analyzed for phosphorus by a colorimetric method (Fisk and Subbarow, "The Colorimetric Determination of Phosphorus," Journal of Biological Chemistry, 66:375, 1925). Phosphorus liberation of the teeth brushed with a fluoride-Victamide dentifrice is compared with that of teeth brushed similarly with a non-stannous tin, non-fluoride, and non-Victamide containing control dentifrice, and the result of such comparison is reported as a percentage reduction of enamel solubility (i.e., ESR).

ESR data were determined in the foregoing manner for several zirconium silicate dentifrices formulated as in Example I, but with the amounts of stannous fluoride and Victamide indicated in Table II. These ESR data, which are reported in Table II, reveal that the provision of Victamide substantially enhances the anticariogenic activity of the oral compositions evaluated.

TABLE II

| Dentifrice Constituents | | | ESR Data Mean Per Cent Reduction |
|---|---|---|---|
| Abrasive | % Stannous Fluoride | % Victamide | |
| $ZrSiO_4$ | 0.0 | 0.0 | — |
| $ZrSiO_4$ | 0.4 | 1.0 | 28.0 |
| $ZrSiO_4$ | 0.4 | 2.5 | 70.8 |
| $ZrSiO_4$ | 0.4 | 5.0 | 69.9 |
| $ZrSiO_4$ | 0.4 | 7.5 | 71.3 |
| $ZrSiO_4$ | 0.4 | 10.0 | 77.9 |
| $ZrSiO_4$ | 0.4 | 12.5 | 72.8 |
| $ZrSiO_4$ | 0.4 | 15.0 | 77.3 |
| $ZrSiO_4$ | 0.4 | 22.0 | 80.5 |

Another indicator of the potential effectiveness of an anticariogenic adjuvant system is the amount of available tin and fluoride ions in aqueous solution. Percentage availability refers to a comparison of an ionic concentration level for a reference solution of the adjuvant without the carrier vehicle (e.g., an aqueous solution of the adjuvant maintained at a reference ionic concentration level, such as 1,000 ppm fluoride). A percentage ratio of the ionic concentration level for the combination solution relative to the reference solution is expressed as a percentage availability (e.g., a combination solution of carrier vehicle in stannous fluoride and Victamide which analyzes 900 ppm fluoride concentration compared to a reference solution of stannous fluoride and Victamide at 1,000 ppm exhibits a 90 percent availability insofar as ability to provide fluoride ions is concerned).

More particularly, percentage availability data for stannous tin and fluoride ions may be determined as follows. An aqueous slurry of the composition sought to be analyzed is mechanically agitated for a suitable period of time (e.g., about 15 minutes), and the mixture is then centrifuged until a clear supernatant liquid is obtained. Separate aliquots of the liquid are analyzed for fluoride and stannous tin ions, with the perchloric acid distillation-thorium nitrate titration analysis being used as a fluoride ion analysis and the potassium periodate potentiometric titration analysis being employed for stannous ions. The values obtained for the experimental values are then compared with those achieved with an aqueous reference solution containing the same amount of stannous and fluoride ions to give a percentage availability figure.

Percentage availability data were determined in the foregoing manner for various dentifrice systems comprising 0.4 percent stannous fluoride and several different concentrations of Victamide varying between 1.0 percent and 10.0 percent. Three different abrasive systems were employed, namely, a 1:3 weight mixture of zirconium silicate and a melamine formaldehyde resin produced in accordance with the teachings of Cooley et al U.S. Pat. No. 3,070,510 and 3,251,800; a 1:3 weight mixture of zirconium silicate and calcium pyrophosphate produced in accordance with the teachings of U.S. Pat. No. 3,112,247; and a 1:3 weight mixture of zirconium silicate and an "improved talc" (i.e., a talc, $Mg_3Si_4O_{10}(OH)_2$, containing at least a minor amount of tremolite, $CaMg_3(SiO_{34})$, as an impurity, as set forth and disclosed in applicant's copending U.S. Pat. application Ser. No. 673,282, filed Oct. 6, 1967). The compositions of these dentifrices were the same, save for the variation in abrasive systems and Victamide levels. The percentage availability data is reported in Table III. The data of Table III substantiates the anticariogenic effectiveness of the compositions of the present invention. In particular, while the inclusion of Victamide in such dentifrice compositions enhances the availability of fluoride ions, the effect of the Victamide is even more pronounced in the case of stannous ions. Thus, in its preferred form, the subject invention encompasses the inclusion of Victamide in oral compositions embodying stannous and fluoride ion containing anticariogenic adjuvants.

Table IV gives ESR data for zirconium silicate - talc (1:3 weight mixture) dentifrices comprising either stannous fluoride or stannous fluorozirconate as an anticariogenic adjuvant and either Victamide, $NaH_2PO_4$, or $KH_2PO_4$. These compositions otherwise comprised the same conventional dentifrice constituents. The ESR data shows that in each instance substantially enhanced anticariogenic activity is achieved with Victamide as compared with the inorganic phosphates provided at the same level.

Dentifrices prepared according to the preferred practice of the present invention have been proven effective in reducing the incidence of dental caries by clinical studies with humans. In one such study, a total of 250 children 10 to 13 years of age residing in a non-fluoride area were given a thorough clinical dental caries examination with the aid of seven-film bitewing radiographs according to techniques described previously (Muhler, J.A.D.A., 64:216, 1962). The subjects were then divided into five equal groups according to dental age and past dental caries experience and were provided a toothbrush and a supply of the respective dentifrices packaged in plain white, coded tubes. Three of the five groups received dentifrices comprising Victamide. Additional supplies of dentifrice and toothbrushes were provided monthly throughout a one-year study period. The subjects were again given a thorough clinical and radiographic dental caries examination at the termination of the study period in order to determine the number of decayed, missing, and filled teeth (DMFT) and decayed, missing, and filled surfaces (DMFS), well-known indexes of anticariogenic effectiveness. The results of this study are summarized in Table V. The results of Table V verify the effectiveness of the fluoride-Victamide compositions of the present invention in reducing the incidence of dental caries and the marked superiority of Victamide over inorganic phosphates in enhancing anticariogenic activity.

TABLE IV

| Dentifrice constituents | | | | | | | ESR data mean percent reduction |
|---|---|---|---|---|---|---|---|
| | Fluoride | | Phosphates | | | | |
| Abrasive | $SnF_2$ | $SnZrF_6$ | Victamide (percent) | $NaH_2PO_4$ (percent) | $KH_2PO_4$ (percent) | pH | |
| $Ca_2P_2O_7$* —60% | | | | | | 5.0 | |
| $ZrSiO_4$=talc** —39% | 0.41 | | 30 | | | 4.5 | 57.9 |
| $ZrSiO_4$=talc —35% | 0.41 | | | 30 | | 4.5 | 20.1 |
| $ZrSiO_4$=talc —39% | 0.41 | | | | 30 | 4.5 | 24.1 |
| $ZrSiO_4$=talc —41.5% | | 0.28 | 30 | | | 4.5 | 63.2 |
| $ZrSiO_4$=talc —39% | | 0.28 | | 30 | | 4.5 | 28.3 |
| $ZrSiO_4$=talc —39% | | 0.28 | | | 30 | 4.5 | 15.2 |

*Control.   **1:3 weight mixture.

TABLE V

| Group | Dentifrice constituents | | Victamide, weight percent | Mean DMFT incr. | Mean percent reduction in DMFT | Mean DMFS incr. | Mean percent reduction in DMFS |
|---|---|---|---|---|---|---|---|
| | Abrasive | Fluoride | | | | | |
| 1 | Calcium pyrophosphate* | | 0 | 4.90 | | 6.64 | |
| 2 | Calcium pyrophosphate* | $SnF_2$ | 0 | 2.47 | 49.5 | 3.75 | 43.6 |
| 3 | Zirconium silicate, improved talc** | $ZrOGeF_6$ | 5 | 1.88 | 61.8 | 2.00 | 69.9 |
| 4 | Zirconium silicate improved talc** | $Zr(GeF_6)_2$ | 5 | 1.23 | 74.5 | 2.26 | 65.9 |
| 5 | Zirconium silicate, improved talc** | $SnF_2$ | 10 | 1.35 | 72.5 | 1.89 | 71.5 |

*U.S. Patents Nos. 2,876,166 and 2,876,168.   **1:3 weight mixture.

TABLE III

| Dentifrice constituents | | | Percentage availability | |
|---|---|---|---|---|
| Abrasive system | $SnF_2$ (percent) | Victamide (percent) | $Sn^{++}$ (percent) | $F^-$ (percent) |
| Zirconium silicate: improved talc (1:3) weight mixture) | .4 | 10 | 101.6 | 99.3 |
| | .4 | 7.5 | 93.2 | 96.8 |
| | .4 | 5.0 | 91.6 | 95.6 |
| | .4 | 4.0 | 87.7 | 90.3 |
| | .4 | 2.5 | 70.3 | 85.4 |
| | .4 | 1.0 | 37.9 | 75.5 |
| Zirconium silicate: calcium pyrophosphate* (1:3 weight mixture) | .4 | 10 | 92.8 | 91.1 |
| | .4 | 7.5 | 88.3 | 84.3 |
| | .4 | 5.0 | 85.6 | 81.1 |
| | .4 | 4.0 | 85.7 | 79.5 |
| | .4 | 2.5 | 73.7 | 63.2 |
| | .4 | 1.0 | 44.3 | 60.0 |
| Zirconium silicate: resin** (1:3 weight mixture) | .4 | 10 | 94.0 | 87.6 |
| | .4 | 7.5 | 90.7 | 85.3 |
| | .4 | 5.0 | 80.2 | 69.4 |
| | .4 | 4.0 | 76.7 | 73.0 |
| | .4 | 2.5 | 66.4 | 69.7 |
| | .4 | 1.0 | 50.6 | 70.2 |

*U.S. Patent No. 3,112,247.   **U.S. Patent No. 3,070,510.

While the subject invention has been described with reference to certain exemplary embodiments thereof, it should be understood that various changes, modifications, and alterations of materials and in the manners of formulation may be made without departing from the spirit and the scope of the subject invention, as defined in the appended claims.

I claim:

1. An oral composition comprising about 0.01–15.0 percent of a fluoride-containing anticariogenic component by weight of the composition calculated as fluoride ion; at least about 1 percent up to about 40 percent by weight of an ammonium salt of a condensation product of ammonia, $NH_3$, and phosphorus pentoxide, $P_4O_{10}$, selected from the group consisting of

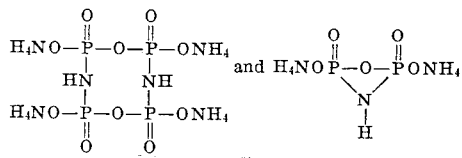

and a carrier suitable for use in the oral cavity.

2. An oral composition, as claimed in claim 1, in which the carrier comprises about 20–80 percent of a dental cleaning and polishing agent by weight of the composition.

3. An oral composition, as claimed in claim 2, wherein the said ammonium salt is present at a level of about 5–15 percent by weight of the composition.

4. An oral composition, as claimed in claim 1, wherein the pH of the composition is about 4.0 to 5.0.

5. An oral composition, as claimed in claim 1, wherein the anticariogenic component further comprises stannous tin.

6. An oral composition, as claimed in claim 1, wherein the fluoride-containing anticariogenic component is present at a level of about 0.01–1.0 percent by weight of the composition calculated as fluoride ion.

7. A method for reducing the incidence of dental caries comprising the application to the oral hard tissues of an acidulated composition comprising:

about 1–40 percent of a condensation product of ammonia, $NH_3$, and phosphorus pentoxide, $P_4O_{10}$, selected from the group consisting of

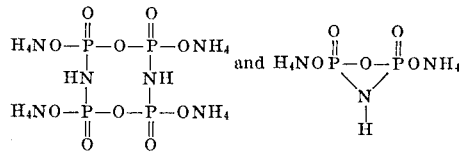

about 0.01–15.0 percent by weight of a fluoride-containing anticariogenic component calculated as fluoride ion; and a carrier suitable for use in the oral cavity.

8. A method, as claimed in claim 7, wherein the carrier comprises about 20–80 percent of a compatible dental cleaning and polishing agent by weight of the composition.

9. A method, as claimed in claim 7, wherein the said ammonium salt is present at a level of about 5 to 15 percent by weight of the composition.

10. A method, as claimed in claim 7, wherein the pH of the composition is about 4.0 to 5.0.

11. A method, as claimed in claim 7, wherein the fluoride component is present at a level of about 0.01–1.0 percent by weight of the composition calculated as fluoride ion.

12. A method, as claimed in claim 7, wherein the anticariogenic component of the composition further comprises stannous tin.

* * * * *